Feb. 18, 1969

C. W. KULIG 3,428,174

APPARATUS AND METHOD FOR HANDLING GLASSWARE FOR INSPECTION OR THE LIKE

Filed Sept. 26, 1966

INVENTOR.
CONSTANTINE W. KULIG
BY
McCormick, Paulding & Huber
ATTORNEYS

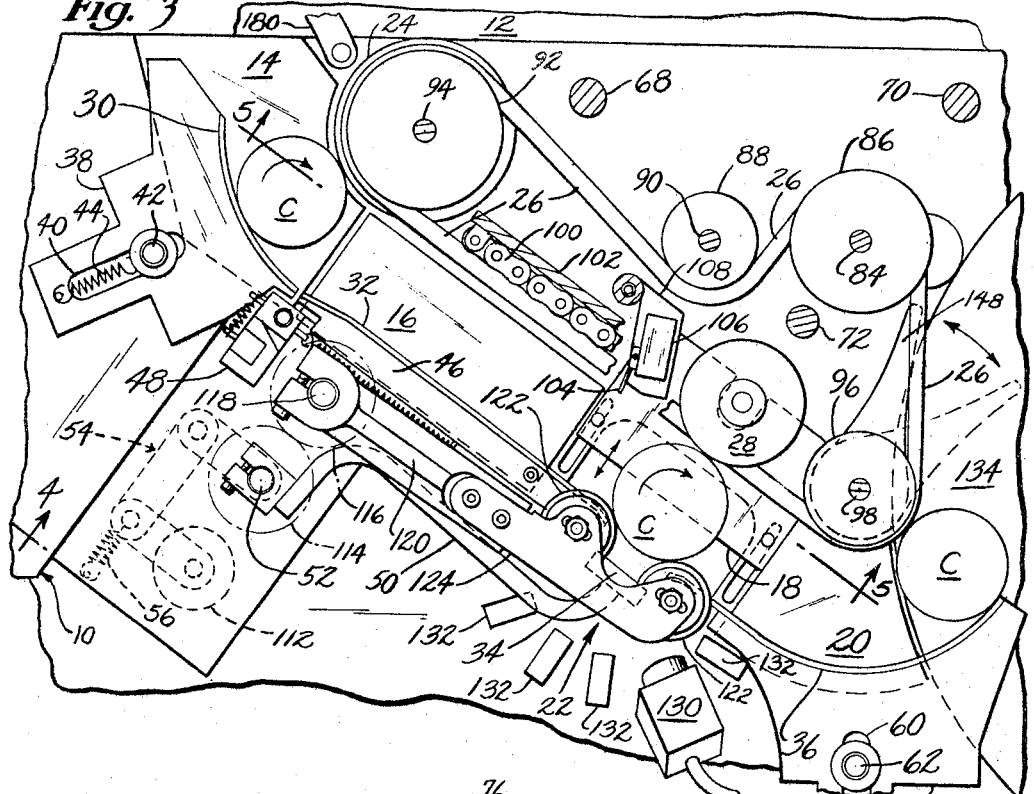
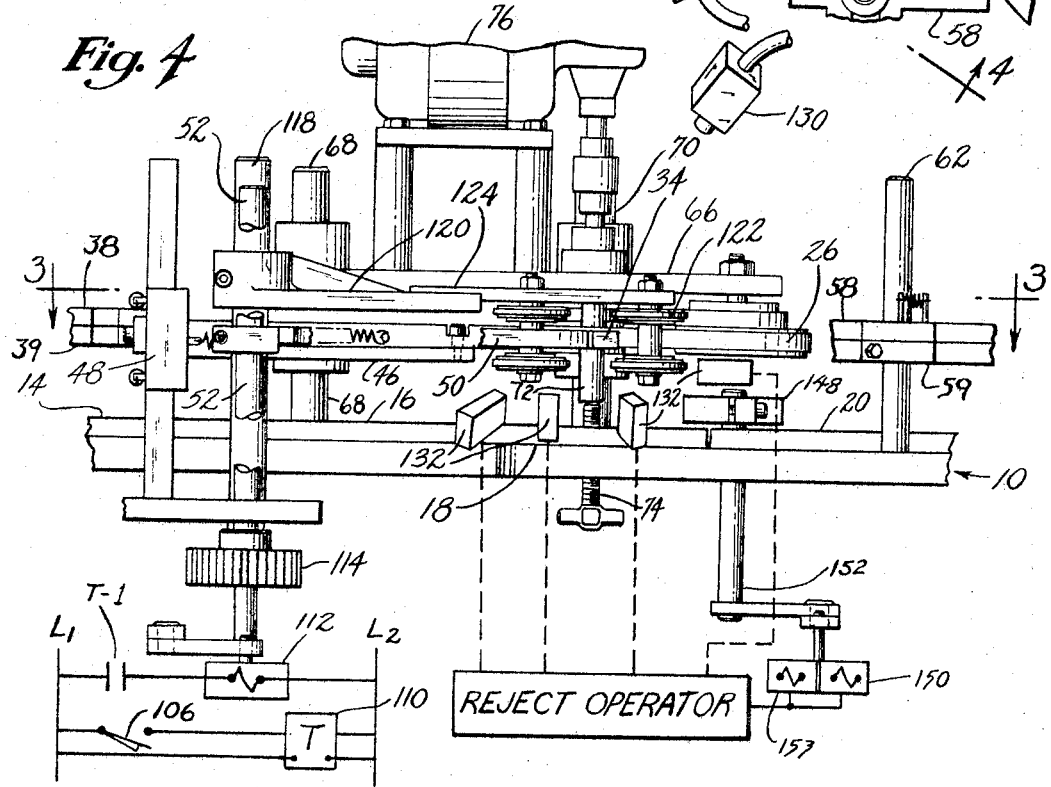

Feb. 18, 1969    C. W. KULIG    3,428,174
APPARATUS AND METHOD FOR HANDLING GLASSWARE FOR
INSPECTION OR THE LIKE
Filed Sept. 26, 1966    Sheet 3 of 4

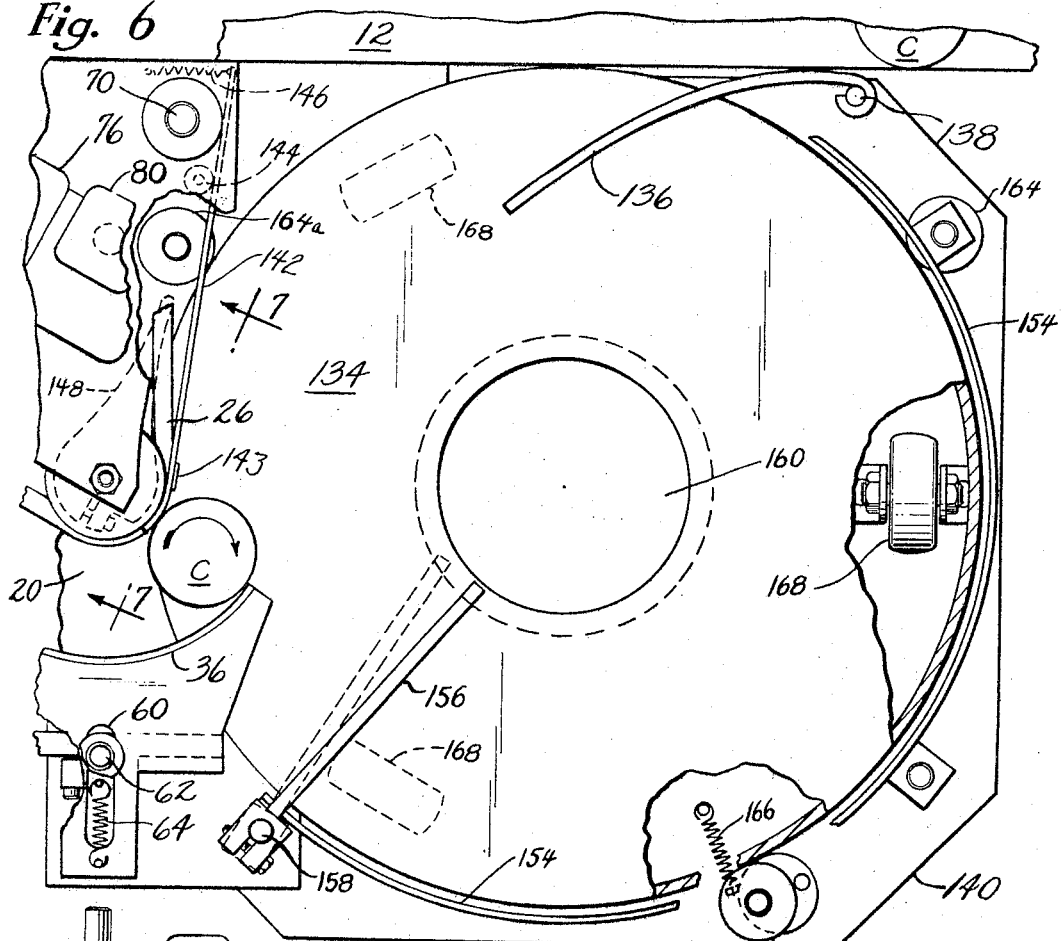
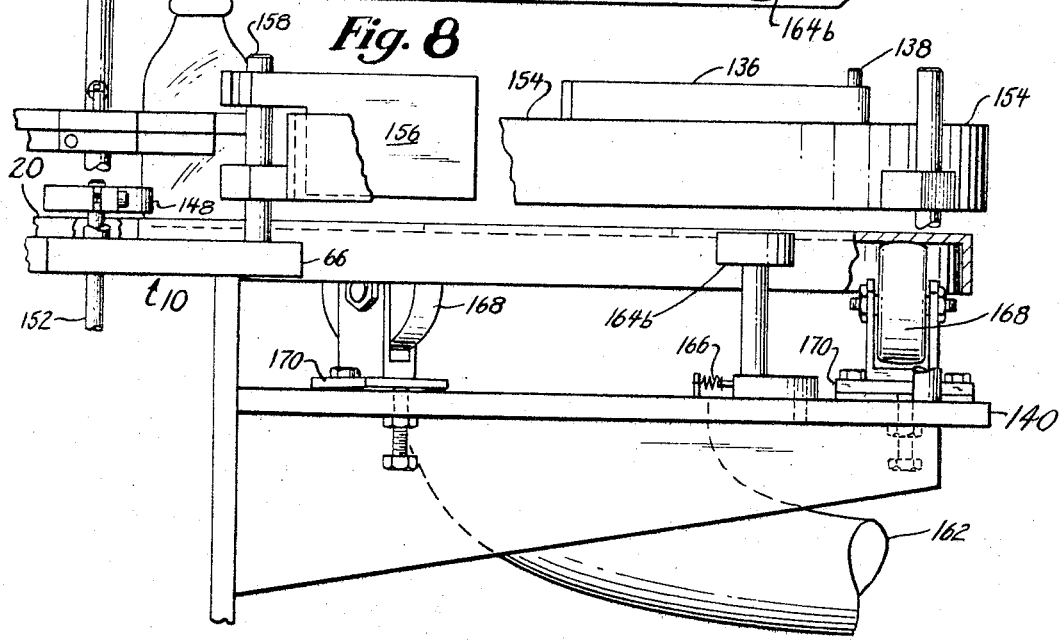

United States Patent Office 3,428,174
Patented Feb. 18, 1969

3,428,174
APPARATUS AND METHOD FOR HANDLING GLASSWARE FOR INSPECTION OR THE LIKE
Constantine W. Kulig, Windsor, Conn., assignor to Emhart Corporation, Bloomfield, Conn., a corporation of Connecticut
Filed Sept. 26, 1966, Ser. No. 581,886
U.S. Cl. 209—73        15 Claims
Int. Cl. B07c 5/342; B65g 47/24

ABSTRACT OF THE DISCLOSURE

An apparatus comprising a base for moving glassware diverted from a conveyor to an inspection station, the ware being moved along the base by engagement of driven side belts and a resilient guide, and the ware being rotated at the inspection station on its own axis. The apparatus also including a driven disk residing in a horizontal plane to move satisfactory ware from the base back onto the conveyor, a fence being provided to assist in guiding the ware over the disk, and a reject gate being provided to move unsatisfactory ware toward a central opening in the disk.

---

This invention relates generally to a method and apparatus for handling glassware articles, such as containers, for inspection purposes wherein a continuous stream of such articles are diverted from a rapidly moving conveyor to an inspection station alongside the conveyor with at least the acceptable portion of such articles being returned to the conveyor at a location downstream of the inspection station.

It is the general object of the invention to provide a glassware handling and inspection apparatus which is reliable in operation and capable of handling glass containers of widely different size with a minimum of adjustment, and which will operate at high speed (in terms of articles handled or inspected), even in the handling of unstable lightweight articles, with maximum stability, and which can be used in the detection of a variety of glassware flaws.

A more specific object of the invention is to provide a handling and inspection apparatus having the aforesaid capabilities and which includes a means for segregating defective glassware articles and for accumulating them for later visual examination of their defects so that a determination of the proper corrective measure can be made to overcome a frequently occurring defect.

As will be described in greater detail, the apparatus of the present invention includes a base for supporting the glass container articles in an upright position for movement in a line along the base to and from the inspection station by being rotated substantially on their own axes. Means is provided for directing the containers from a conveyor onto one end of the base, and means is provided for defining the line of movement of the containers along the base and for rotating them and for delaying them at the inspection station while still being rotated. A driven horizontal transfer disc is located adjacent the other end of the base and adjacent the conveyor to receive containers from the base and to carry them in an upright position near its periphery back to the conveyor, a fence being provided to extend over the disc to guide them back onto the conveyor. A normally open reject gate is provided to permit movement of the containers along one side of the fence to the conveyor, but this reject gate can be actuated by an electric signal from the inspecting device or devices to shift its position and cause movement of defective containers while on the transfer disc to the other side of the fence whereby they can be accumulated and finally disposed of by dropping through an opening at the center of the rotating transfer disc.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 3 is a similarly enlarged horizontal sectional view at the inspection station of the apparatus, as indicated by line 3—3 of FIG. 4;

FIG. 4 is an elevational view showing a part of the apparatus as indicated by the line 4—4 of FIG. 3;

FIG. 6 is a plan view of the transfer disc section of the apparatus;

FIG. 8 is an elevational view of the transfer disc section of the apparatus.

Figure 1:
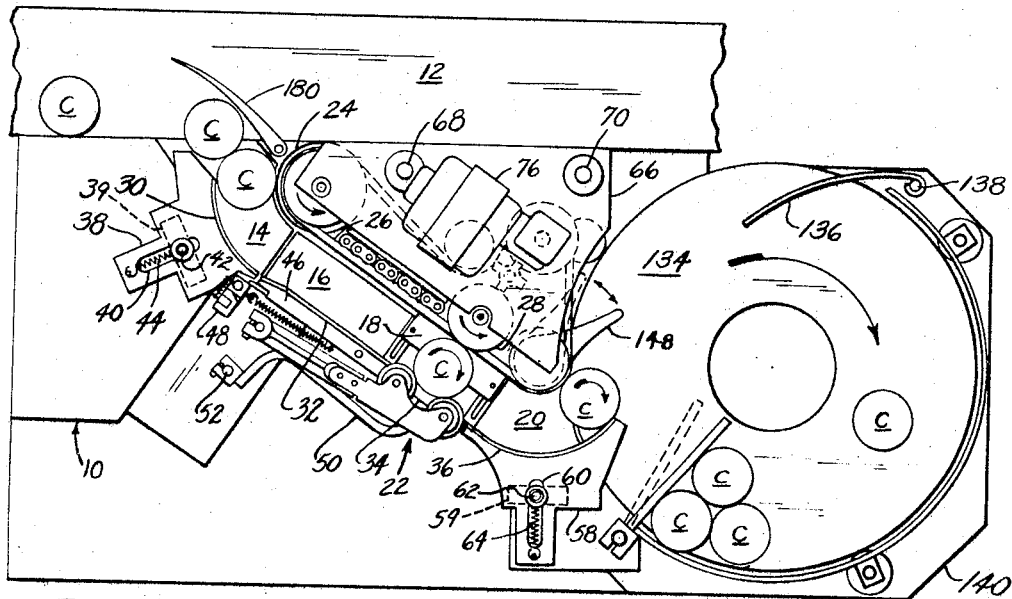
FIG. 1 is a plan view of a glassware handling and inspection apparatus constructed in accordance with the present invention and located at the side of a high speed conveyor.

As best shown in FIG. 1, the apparatus of the present invention includes a table-like frame 10 which is located at one side of a horizontal conveyor 12 whereby the apparatus is positioned to divert a line of articles, such as glass containers C, C, from the conveyor for inspection or other purposes and then to return them to the conveyor at a downstream position thereon. Also included in the apparatus is a base for supporting the containers in upright position as they are moved from the conveyor into the apparatus to and from an inspection station in the apparatus. In the preferred form shown, the base comprises four horizontal plates 14, 16, 18, and 20 which are supported on the table frame 10 and of which at least the plate 18 is capable of being adjustably located on the table frame, the said plate 18 being the base plate used at an inspection station which is indicated generally by the reference numeral 22.

The line of movement for the containers C, C, over the base is defined in part by a first friction wheel 24 which rotates on a vertical axis near one end of the base adjacent the conveyor 12, an endless belt 26, and a second friction wheel 28 at the inspection station 22. These devices are all located at one side of the base, and the line for movement of the containers over the base is further defined by a multi-section guide at the other side of the base or base plates. The multi-section guide comprises four parts, a first arcuate guide rail 30 cooperating with the first friction wheel 24, a second substantially straight guide rail 32 cooperating with the endless belt 26 on the upstream side of the inspection station, another straight guide rail section 34 carried on a pivot arm and cooperating with the second friction wheel 28 at the inspection station 22, and an arcuate guide rail section 36 cooperating with the endless belt 26 on the downstream side of the inspection station 22.

All of the guide rail sections 30, 32, 34 and 36 are preferably resiliently biased inwardly from the said other side of the base to effect firm frictional engagement on both sides of containers passing along the base in cooperation with the first friction wheel 24, the endless belt 26, and the second friction wheel 28, all of which are driven to effect rotation of the containers and to roll them along the multi-section guide and thus effect their movement along the base.

The guide section 30 comprises an arcuate vertical flange on a horizontal plate 38 which is permitted limited sliding movement on a lower plate 39 rigidly secured to a post 42 extending upwardly from the frame 10. The plate 38 has a slot 40 receiving the post 42, and a spring 44 is connected between the plates 38 and 39 to resiliently bias the guide rail section 30 inwardly of the base.

The second guide rail section 32 also includes a vertical flange on a horizontal bar 46 which is supported on a vertical post 48 with suitable means (not shown) biasing said rail section inwardly of the base. The third guide rail section 34 is mounted on the end of a pivot arm 50 which at its other end is secured to vertical shaft 52 which can be rotated or pivoted by a linkage 54 (FIG. 3) which is biased by a spring 56 to bias the guide rail section 34 inwardly.

The last guide rail section 36 at the other end of the base comprises an arcuate vertical flange on a plate 58 which is permitted limited sliding movement on a lower plate 59 rigidly secured to a vertical post 62 extending from the table frame 10. The plate 58 has a slot 60 receiving the post 62, and a spring 64 (FIG. 1) is connected between the said plates 58 and 59 to urge the guide rail section 36 inwardly of the base.

As best shown in FIG. 4, the guide rail plates 38, 46, and 58 and the guide rail arm 50 are supported on their vertical posts above the table frame 10 and the base plates thereon. Preferably, the said guide rail plates and pivot arm are vertically adjustably supported on their posts so that they can be positioned to engage the sides of various size containers at a desired elevation over the base.

Figure 5:
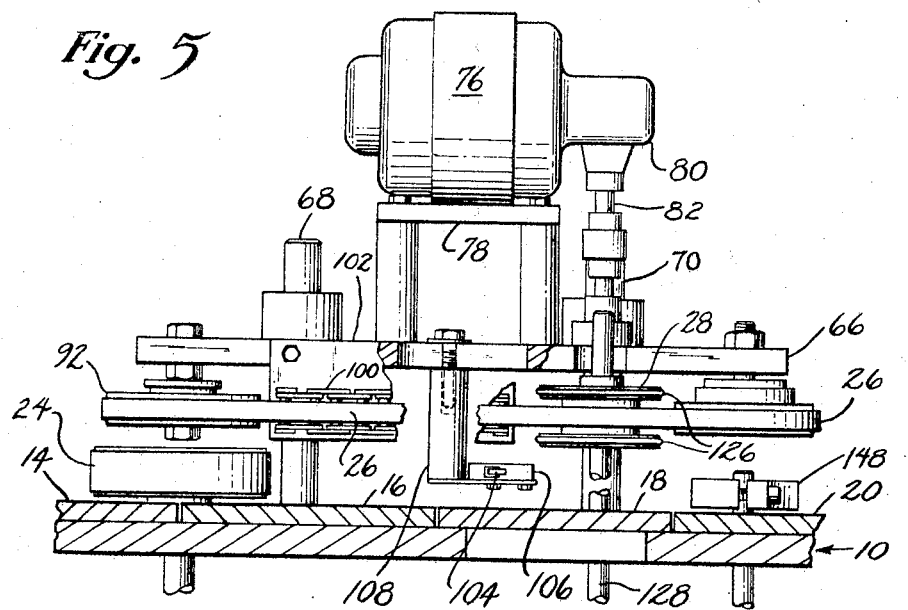
FIG. 5 is a vertical sectional view taken through a portion of the apparatus as indicated by the line 5—5 of FIG. 3.

As shown in FIG. 5, the endless belt 26 is supported on pulleys (to be described) rotating on vertical shafts or axes depending from a support plate 66 which is disposed horizontally and is vertically adjustably mounted on vertical posts 68, 70 and 72 (FIG. 4) extending upwardly from the frame 10. Preferably, the horizontal support plate 66 can be adjusted vertically on its support posts by means of a manually operable jack shaft 74 (FIG. 4) which is threaded into the frame 10 and extends upwardly toward the said support plate. This adjustment is also for the purpose of raising and lowering the endless belt 26 so that it will engage the sides of containers of various sizes at desired elevations as they move along the base.

A drive motor 76 (FIGS. 1, 3 and 5) is supported on a platform 78 over the support plate 66 and it is connected through a gear box 80, having an output shaft 82, to drive a shaft 84 (FIG. 3) which extends vertically downwardly through the support plate 66. A drive pulley 86 is secured to the shaft 84 to receive and drive the endless belt 26. The belt 26 moves counterclockwise around the pulley 86 as viewed in FIG. 3 and it then passes around an idler pulley 88 on a vertical shaft 90 which is adjustably supported on the support plate 66 to apply proper tension to the belt. Continuing in the generally counterclockwise direction, the belt 26 extends around a pulley 92 which is rotatable on a shaft 94 depending from the support plate 66, preferably on the same axis as the first friction wheel 24. The belt 26 then extends along the said one side of the base throughout the length of the base and finally passes around a pulley 96 which is rotatable on vertical shaft 98 depending from the support plate 66. After leaving the pulley 96, the belt returns to the drive pulley 86.

It is the straight portion of the belt 26 extending between the pulleys 92 and 96 which engages the containers C, C to rotate them and thus to roll them along the opposed vertical guide. This straight portion of the belt is backed up or supported in engagement with the containers by a roller link chain 100 which is secured at its ends to a vertical plate 102 which is held in a vertical position along one edge of the horizontal support plate 66. The roller links of the said chain reduce friction on the belt while supporting the belt against horizontal movement away from the base or path of movement of the containers.

The first friction wheel 24, while rotating on approximately the same axis as the end pulley, is preferably independently continuously driven by an electric motor (not shown) at a lesser peripheral speed than the lineal speed of the endless belt 26. The friction wheel 24 is of greater diameter than the pulley 92 and thus it extends inwardly from the said one side of the base beyond the endless belt. Thus, the friction wheel 24 and its cooperating guide rail section 30 initiate rotation of each of the series of containers C, C at a lesser speed than that imparted thereto by the friction belt 26 and its cooperating guide rail sections.

Therefore, when each container is disengaged from the friction wheel 24 and the guide rail section 30 and is taken up by the endless belt 26 and the guide rail section 32, it is accelerated along the base plate 16 to effect a spacing from the following container. This speed differential is set to provide a predetermined spacing between adjacent containers being moved by the endless belt if the said adjacent containers abut each other while being engaged by the friction wheel 24. The said predetermined spacing is sufficient to permit the leading container to be detained and rotated at the inspection station 22 before the succeeding container catches up with it or can cause any jamming at the inspection station.

The first friction wheel 24 is vertically adjustable and the wheel can be located near the pulley 92 or adjacent the base as shown in FIG. 5, because the overhead friction belt riding on the pulley 92 will prevent toppling of the containers as they are given initial rotation by the friction wheel.

As each container C moves along the base, and just before entering the inspection station 22, it will engage and actuate an operator 104 for a limit switch 106 which is supported in the path of movement of the containers on a bracket 108 suspended from the support plate 66 as best shown in FIGS. 3 and 5. The limit switch 106 is normally open and when it is actuated and closed by a passing container it energizes a timer 110 as schematically illustrated in the wiring diagram portion of FIG. 4. The timer 110 closes contacts T–1 in circuit with a rotational solenoid 112 whereby the said solenoid is energized for a timed period. At the end of the period, the contacts T–1 open and solenoid 112 is de-energized.

As best shown in FIG. 3, the rotational solenoid 112 is connected to one end of the linkage train 54 which is biased by the spring 56 normally to retain the shaft 52 and the arm 50 in the counterclockwise position of FIG. 3, wherein the guide rail section 34 is positioned inwardly of the base in a line with the sections 32 and 36. When the rotational solenoid 112 is energized as described, the linkage 54 is shifted to pivot the arm 50 clockwise and thus to remove or withdraw the guide rail section 34 from its normal position at the inspection station 22. When the arm 50 moves outwardly, its pivot shaft 52 rotates a gear 114 keyed thereto below the table frame 10 in a clockwise direction as viewed in FIG. 3. The said gear 114 is meshed with a gear 116 which is keyed to a vertical pivot shaft 118 and thus the gear 116 and pivot shaft 118 are rotated through a portion of a revolution in the counterclockwise direction as viewed in FIG. 3.

An arm 120 is vertically adjustably secured to the pivot shaft 118 at one of its ends, and this arm carries at least one roller at its other end to be brought into engagement with a container at the inspection station 22 when the guide rail section 34 is withdrawn. That is, due to the gearing and linkage described, when the arm 50 moves outwardly, the arm 120 moves inwardly under the force of the rotational solenoid 112, and after the end of the time delay period for which that solenoid is energized, the spring 56 causes the arm 50 to be returned to its normal inward position and at the same time, the arm 120 swings outwardly from the said other side of the base.

While one roller on the end of the arm 120 may suffice, preferably there are two double rollers 122, 122 rotatably supported on spaced apart shafts depending from a bracket 124 on the said other end of the arm. The double rollers 122, 122 have twin sections which are vertically spaced apart on their respective shafts, and as seen in FIG. 3, the rollers 122, 122 engage the side of a container C at the inspection station 22 in angularly spaced relationship around the container but on the side of the base opposite the second friction wheel 28. Preferably, the said second friction wheel 28 is also a double wheel comprising vertically spaced apart tread portions 126, 126 as shown in FIG. 5. The wheel 28 is keyed to a shaft 128 in vertically adjusted position, the said shaft extending upwardly from below the table frame 10 and being driven continuously either by the motor 76 or by independent motor means, not shown. It will be seen in FIG. 3 that the periphery of the drive or tread sections of the friction wheel 28 extend inwardly of the base beyond the endless belt 26 to engage the side of a container cooperatively with the rollers 122, 122 at the inspection station. The said friction wheel and rollers cooperate to rotate each container at the inspection station for a period of time sufficient to perform an inspection operation. The switch 106 is adjusted along the container path relative to the inspection station 22 to be certain that each container is engaged in proper timing at the inspection station.

While a variety of different inspection mechanisms can be used at the inspection station 22, an optical inspection mechanism is shown for purposes of illustration. The container-handling mechanism as thus far described can also be used to bring containers in sequence to the station 22 for purposes other than inspection. One form of inspection mechanism is schematically illustrated in FIGS. 3 and 4, this being an optical system for detecting "checks" or other flaws in the glassware. Such optical system may include one or more sources of light 130 or other radiant energy means, directing a beam onto a container C at the inspection station and one or more light pick-up devices 132, 132 supported around the station to receive light reflected by a defect in the container. These pick-up devices, which may comprise fiber-optic bundles, transmit the light to a reject operator which includes a photocell or other device capable of providing a reject signal upon light being reflected by a flaw to any one of the devices 132, 132. This reject signal is used to operate a reject mechanism as will be described.

It is to be understood that when employing an optical inspection mechanism such as described, the light source and pick-up devices may be directed to various areas of each container being inspected. It is often desirable to inspect the bottom corner portions and the bottom of containers for flaws, and in order to provide access for such inspection, the base plate 18 is made adjustable on the table frame 10 as shown in FIG. 3 so that the entire bottom area of the container can be inspected.

No matter what form of inspection mechanism is employed to provide an electrical reject signal, the defective containers are rejected or diverted after leaving the inspection station and the flawless containers are returned to the conveyor 12. All containers upon completion of the timed period of rotation at the inspection station 22 are released by withdrawal of the rollers 122, 122 and the return of the guide rail section 34 to move off the base plate 18 and onto the base plate 20 at the end of the base remote from the conveyor. The containers are, of course, propelled from the inspection station by the friction wheel in cooperation with guide rail section 34 and then by the endless belt 26 engaging them in cooperation with the arcuate guide rail section 36. As best seen in FIGS. 1, 3 and 6, the endless belt 26 and arcuate guide rail section 36 cooperate to move the containers in turn in a counterclockwise direction around the belt pulley 96 and off the base plate 20 onto the top surface of a horizontally disposed clockwise rotating annular transfer disc 134.

Figure 7:
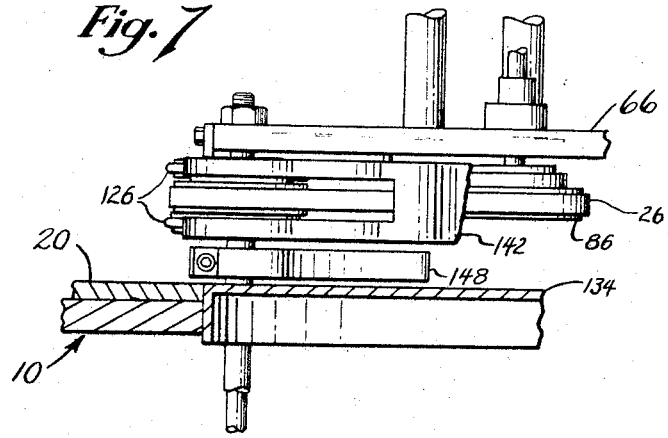
FIG. 7 is a vertical cross-sectional view showing a portion of the apparatus as indicated by the line 7—7 of FIG. 6.

As seen in FIGS. 6 and 7, the transfer disc 134 is positioned between the downstream end of the base and the conveyor 12 and its top surface is in the same plane as the end base plate 20 and the said conveyor. When a container is moved by the endless belt 26 off the end base plate 20 and onto the transfer disc, it is carried in an upright position on the peripheral portion or margin of the disc in a clockwise direction as viewed in FIGS. 1 and 6. In order to move each container off the transfer disc and back onto the conveyor 12, an arcuate fence 136 is disposed horizontally over the transfer disc to direct the containers in line on one side of the said fence and off the transfer disc onto the conveyor. The said fence is supported on a post 138 extending upwardly from a platform 140 which comprises a part of the frame 10.

In effecting smooth and reliable transfer of the containers onto the disc 134, a spring guide 142 (FIGS. 6 and 7) is mounted to direct the containers away from the belt to prevent continued rotation of the containers on their own axes as they move onto the disc 134, and a small piece of friction material 143 is provided on the guide 142 to engage and snub out any remaining rotation of the containers. The said spring guide has a bifurcated end which straddles the belt 26 and is mounted on a pin 144 depending from the support plate 66. A tension spring 146 (FIG. 6) provides bias on the said spring guide 142 inwardly of the disc 134.

Only the good containers are to be returned to the conveyor 12, and the defective containers are to be rejected. The rejected containers are to be directed to the other side of the fence 136, that is, that side of the fence which is radially inwardly relative to the transfer disc. A reject gate 148 is provided to direct the containers C, C on the disc 134 selectively toward the said one and other sides of the fence 136. This reject gate 148 has a normal position (the broken line position in FIG. 1 and the full line position of FIG. 3) wherein the containers are permitted to move to the said one side of the fence and are guided in that direction by the spring guide 142, and it also has a position which it assumes responsive to a reject signal (the full line position in FIG. 1 and the broken line position of FIG. 3) wherein it directs a rejected container to the other side of the fence 136.

The reject gate 148 is operated as schematically illustrated in FIG. 4 by means of a pair of rotational solenoids 150 and 153 which operate to rotate a shaft 152 to which the reject gate 148 is fastened. The shaft 152 is rotated or pivoted only through part of a revolution by the rotational solenoid 150 responsive to a reject signal from the reject operator to place it in the reject position shown in full lines in FIG. 1 and in broken lines in FIG. 3. The reject operator preferably includes a timer which will momentarily but sufficiently energize the solenoid 150 after an inspected and defective container has left the inspection station 22 and has reached the edge of the transfer disc 134 to direct the defective container to the said other side of the fence 136. Then, the solenoid 153 will be energized by a signal caused by an inspected satisfactory container to return the reject gate 148 to its said normal position, thus to cause the good container to move along the said one side of the fence.

While the rejected containers which are diverted to the said other side of the fence 136 can immediately be removed from the transfer disc 134, preferably they are retained on and accumulated in some number on the said transfer disc so that they can be visually inspected to determine the existence of any repetitive defect so that corrective action can be taken. In order to accumulate the defective containers on the said disc, a circular segment guide railing 154 is provided around the periphery of the disc from the said other side of the fence 136 to a stop bar 156. The stop bar 156 is pivotally adjustably mounted in a generally radial position over the disc 134 (FIG. 6) on a support post 158 which projects upwardly from the support plate 66 adjacent the periphery of the transfer disc. As rejected containers accumulate on the disc against the stop bar 156, they leave the accumulated group and move radially inwardly of the transfer disc 134 wherein they will fall through the central opening 160 provided in the said disc and thus into a cullet chute 162 (FIG. 8) for removal of the rejects. Thus, by adjusting the bar 156, a selected number of rejected containers can be collected on the transfer disc, and thereafter additional rejected containers will be removed through the central opening of the disc.

Since the reject opening is centrally located, it is desirable to drive or rotate the transfer disc at its periphery. While this may be done in various ways, a presently preferred drive comprises a plurality (three shown) of rollers 164, 164 which engage the periphery of the disc. One of these rollers, for example, roller 164a is driven by the electric motor 76 or by other means to effect rotation of the transfer disc, and another roller, for example, roller 164b, is mounted on a pivoted base so that it can be urged radially inwardly as by a spring 166 to assure engagement of all of the rollers with the periphery of the disc.

The transfer disc is supported for such drive on a series of additional rollers 168, 168 which rotate on generally horizontally axes. The rollers 168, 168 are idler support rollers, but they are preferably mounted on tilt bases 170, 170 as shown in FIG. 8 so that their height can be adjusted to bring the top surface of the disc 134 into precise level with the base plate 20 and with the surface of conveyor 12.

Figure 2:
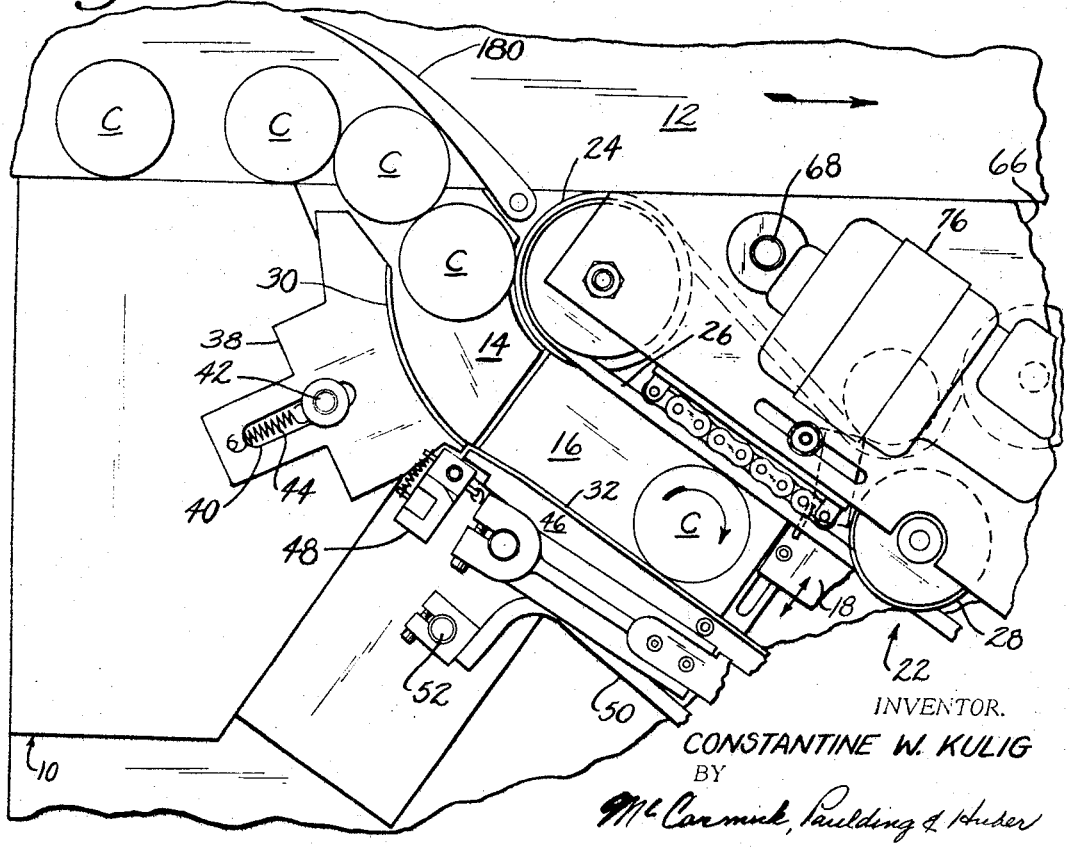
FIG. 2 is an enlarged plan view of the entrance end of the apparatus shown in FIG. 1.

The aforedescribed apparatus operates to handle glass containers or the like in accordance with a new and novel manner for the purpose of inspecting each such container C being advanced on the horizontal conveyor 12. The first step performed according to the new method is to direct the containers off the conveyor and into a single line at one side of the conveyor. The means used to direct the containers off the conveyor may take various forms. The presently preferred means comprises a guide arm 180 (FIGS. 1 and 2) which is pivotally supported as a part of the apparatus on the said one side of the conveyor so that it can be moved into position as shown to direct the containers off the conveyor and into the apparatus and so that it can also be moved to the side of the conveyor to an inoperative position when the container handling apparatus is not being used.

The arm 180 is thus used to direct the containers into a single line of advance as they enter the apparatus on the plate 14. Each such container is initially moved along this line by the conveyor 12 forcing other containers into the line. The containers may thus bunch up in the line until the foremost container is engaged in substantially diametrically opposed locations while on the base plate 14 by the first friction wheel 24 and the opposed guide section 30. This imparts rotation to each container in turn about its own longitudinal axis, and this rotation is continued by the endless belt 26 and the opposed guide section 32 as each container continues in the line of advance along the base plate 16. While thus moving along the line of advance, each container is in turn accelerated by reason of the more rapidly moving endless belt 26 to effect a minimum spacing between containers in the line of advance.

Then, as each container in turn reaches the base plate 18 at the inspection station 22, it is detained at the inspection station while its rotation about its own axis is continued. Then, as each container in turn is released from the inspection station and is moved across the base plate 20 onto the transfer disc 134, its rotation about its own axis is stopped. The transfer disc then constitutes a moving platform for transferring the non-rotating containers in turn through a generally circular path toward a point of substantial tangency with the side of the moving horizontal conveyor 12 from which the containers were initially diverted.

The arcuate fence 136 which extends over a portion of the transfer disc 134 adjacent its point of substantial tangency with the conveyor 12 assists the final step of moving the inspected and satisfactory containers back onto the conveyor. Preferably, the previously mentioned one side of the fence 136 is provided with a friction surface which will re-initiate rotation of each container about its own axis as it moves toward the said point of substantial tangency. It will be seen that this rotation is clockwise when viewed from the top so that the side of each container which first moves onto the conveyor will be moving in the direction of the conveyor. While the various drive media used in the container handling apparatus can be operated at various speeds within a substantial range, the speed of operation of the various parts is adjusted for smooth movement of the containers off the conveyor through the apparatus and back onto the conveyor. In this connection, the transfer disc 134 is rotated at a speed wherein its peripheral velocity is substantially equal to the lineral velocity of the containers as they are moved into and out of the inspection station. As the containers contact the friction surface on the said one side of the fence 136, the containers are rotated and their lineal velocity is reduced to substantially equal the speed of the conveyor for smooth transfer onto the conveyor. It will be seen that in operation of the various elements at any predetermined speed, a selected minimum spacing can be maintained between containers on the conveyor after they leave the handling apparatus of this invention.

The invention claimed is:

1. Apparatus for diverting glass containers from a conveyor to a station having an inspecting mechanism or the like, said apparatus comprising a base for supporting the containers in upright position as they are moved along in a line by being rotated substantially on their own axes, means for directing containers from the conveyor onto one end of the base, a first driven friction wheel disposed at one side of the base adjacent its said one end, a guide extending along the opposite side of the base including a section cooperating with said first friction wheel to engage the containers and advance them along the base by rotation in the direction imparted by the wheel, a driven endless belt located at said one side of the base and cooperating with said guide to engage containers departing said first friction wheel to continue to advance them in said one direction but at a greater speed than said first friction wheel to space them along said base, apparatus for delaying and rotating each container at the inspection station including a second driven friction wheel extending inwardly of the belt from said one side of the base, at least one roller movable inwardly of said guide from said opposite side of the base to engage each container in cooperation with said second friction wheel, and automatically operable means for retracting said roller after a period of rotation of each container at said inspection station to release the same for continued advance by said belt and guide toward the other end of said base.

2. Apparatus as defined in claim 1 wherein said guide comprises a plurality of sections which are biased inwardly from said opposite side of the base to cooperate respectively with said first friction wheel, said endless belt, and said second friction wheel in moving said containers from said one end toward said other end of the base.

3. The apparatus set forth in claim 2 wherein one of said guide sections cooperating with said second friction wheel is mounted on a first pivotally supported arm and said roller is mounted on a second pivotally supported arm which is linked to said first arm to provide movement of said one section outwardly as said roller moves inwardly from said opposite side of the base and vice versa, and electrical means controlling automatic operation of said arms and actuated by a container approaching said second friction wheel to move said one section outwardly and said roller inwardly for a timed period to engage said container at said inspection station and to then reverse the movement of said one section and roller to release said container at the inspection station.

4. The container handling mechanism as set forth in claim 3 wherein said roller comprises one of a pair rotatably supported on said second arm to engage a container at said inspection station with said second friction wheel.

5. The apparatus set forth in claim 1 wherein a driven horizontal transfer disk is located adjacent said other end of the base to receive inspected containers therefrom and to carry them in upright position near the periphery of its top surface, and wherein a fence extends over a portion of said transfer disk to guide containers from the peripheral portion of said disk along one side of the fence and off the transfer disk back onto said conveyor.

6. The apparatus set forth in claim 1 wherein said inspecting mechanism provides an electrical reject signal upon detection of a defective container at said inspection station, a driven horizontal transfer disk is located adjacent said conveyor and said other end of the base to receive inspected containers and to carry them in upright position near the periphery of its top surface, a fence extends over a portion of the transfer disk to guide containers from the peripheral portion of said disk along one side of the fence and off the transfer disk back onto said conveyor, an electrically operable reject gate is provided for operation responsive only to said reject signal to move over said transfer disk for a brief period sufficient to direct said defective container toward the other side of said fence so that it cannot be returned to the conveyor by said transfer disk.

7. Apparatus for diverting glass containers from a conveyor to a station having an inspecting mechanism capable of providing an electrical reject signal upon detecting a defect in a container at the station, said apparatus comprising a base for supporting the containers in upright position for movement in a line along the base to and from the inspection station, means for directing containers from the conveyor onto one end of the base, means defining the line of movement for the containers along said base, a driven horizontal transfer disc located adjacent the other end of the base and adjacent the conveyor to receive containers from the base and to carry them in upright position near the periphery of its top surface, a fence extending over a portion of said transfer disc to guide containers from the peripheral portion thereof along one side of the fence and back onto the conveyor, and an electrically operated reject gate disposed at said other end of the base normally in position to permit movement of containers onto the peripheral portion of said transfer disc but operable responsive to a reject signal to move into position over said transfer disc for a period sufficient to direct a defective container toward the other side of said fence so that it cannot be returned to the conveyor.

8. The apparatus of claim 7 wherein a railing segment extends around a portion of said disc on said other side of the fence, and a stop bar is generally radially disposed over said transfer disc to engage and to retain rejected containers on said disc within said railing segment.

9. The apparatus set forth in claim 7 wherein said transfer disc is supported and rotated by a plurality of rollers; some of said rollers, including a driven roller, engaging said transfer disc tangentially; and other of said rollers being arranged in a circumaxially spaced series and engaging the bottom surface of said disc.

10. The apparatus set forth in claim 8 wherein said transfer disc is supported and rotated by a plurality of rollers; some of said rollers, including a driven roller, engaging said disc tangentially; and other of said rollers being arranged in a circumaxially spaced series outwardly from said central opening and engaging the bottom surface of said disc.

11. A driven horizontally disposed annular disc for transporting a line of glass containers being inspected and for discharging satisfactory containers at its periphery while diverting unsatisfactory containers, in combination with means defining an entry for the line of containers onto the peripheral portion of the top surface of the disc, a fence extending over a portion of the disc to guide satisfactory containers from the peripheral portion thereof along one side of the fence and off the outer edge of the disc, means movable into position between the extending end of said fence and said entry to divert unsatisfactory containers to the other side of the fence, and means disposed over said disc to guide said diverted unsatisfactory containers off the disc through its central opening.

12. The combination defined in claim 11 wherein said last-mentioned means comprises a railing segment extending around a portion of said disc on said other side of the fence, and a stop bar generally radially disposed over said disc to engage and collect rejected containers before directing them through said central opening.

13. The method of handling glass containers advancing on a horizontal conveyor for the purpose of inspecting each such container and comprising the steps of directing the containers off the conveyor and into a single line at one side of the conveyor, advancing the containers in said line by engaging them in substantially diametrically opposed locations and imparting rotation thereto about their own longitudinal axes while accelerating the advance of each container in turn to effect a minimum spacing between containers in said line, detaining each accelerated container in turn at an inspection station in the line of advance while continuing to rotate each container, stopping the rotation of each container after departure from said inspection station, transferring the non-rotating containers on a moving base through a generally circular path toward a point of substantial tangency with the said one side of the conveyor, and directing the containers in turn back onto said conveyor adjacent the said point of substantial tangency.

14. The method of container handling set forth in claim 13 including the additional step of rejecting any container failing an inspection at said inspection station by removing such container from said circular path prior to the time it reaches said point of substantial tangency.

15. The method of container handling set forth in claim 13 including the additional step of imparting rotation to said containers on their own longitudinal axes as they approach said point of substantial tangency so that the side of each container first moving onto said conveyor moves in the direction of the conveyor.

References Cited

UNITED STATES PATENTS

| 2,132,447 | 10/1938 | Stout | 88—14 |
| 2,902,151 | 9/1959 | Miles et al. | 209—111.7 |
| 3,101,848 | 8/1963 | Uhlig | 209—111.7 X |
| 3,133,638 | 5/1964 | Calhoun | 209—111.7 X |

ALLEN N. KNOWLES, *Primary Examiner.*

U.S. Cl. X.R.

198—22, 33; 209—74, 111.7